March 20, 1956 G. H. MOREY 2,739,220
ELECTRICAL HEATING DEVICE
Filed Feb. 3, 1954

INVENTOR
Glen H. Morey,

BY Burns, Doane, Benedict & Irons
ATTORNEYS

2,739,220

ELECTRICAL HEATING DEVICE

Glen H. Morey, Terre Haute, Ind., assignor to Linton-Summit Coal Company, Inc., Terre Haute, Ind., a corporation of Indiana Application February 3, 1954, Serial No. 407,899

4 Claims. (Cl. 219—38)

This invention relates to heating devices generally adapted to heat glass or other fragile vessels. More specifically, the invention relates to such a heating device which partially encases a portion of the vessel to be heated.

A variety of heating devices have been designed for heating glass distilling flasks. As exemplary of one type of such heating devices, my prior Patents Nos. 2,231,506 and 2,282,078 disclose flask heaters which encase all or a portion of the flask to most effectively transmit to the contents of the flask the heat created by energizing the heating element in the heater.

Although the previously developed heating devices have proved to be entirely satisfactory for many uses, it has been found that particularly in fractional distillation such prior heaters are not completely satisfactory and in fact have certain drawbacks in their use for such purpose. In fractional distillation the high boiling fractions remain in the bottom of the flask or container until the last and, in order to vaporize such high boiling material, supplemental or concentrated heat must be applied thereto.

In the presently available vessel heaters, a single electrical heating element is distributed over the entire surface of a pocket which receives the vessel to be heated. In using a single heating element, the residual small quantity of high boiling material near the bottom of the vessel has to be vaporized by increasing the power applied to the single circuit to supply the requisite vaporizing heat at the bottom of the vessel. The necessary increase in power input to the single circuit obviously results in extensive heat transfer through the bare wall of the kettle or vessel above the liquid level. This heat transfer through the wall of the vessel produces undesirable superheating of the vapors within the vessel above the remaining high boiling material.

A further drawback to electrical heating devices employing a single main heating element resides in the difficulty in controlling the temperature of the contents of the vessel being heated. With a single main heating element coupled to the usual temperature control mechanism, the intermittent energization of the heating element results in surges in the temperature of the vessel contents, making uniform temperature control thereof extremely difficult, if not impossible.

The above-discussed drawbacks in the single main heating element vessel heaters are overcome by the hereinafter disclosed electrical heating device which is particulaly effective in distillation operations without creating undesirable superheating of the vapors, and also permits close temperature control during the entire course of the heating operation. These advantages are secured by coupling an auxiliary heating element into the heating device to be operable in combination with the main heating circuit. This auxiliary heating element is appropriately interrelated with the main heating element so as to apply the heat generated thereby to the lower central portion of the vessel being heated by the heating device. This particular positioning of the auxiliary heating element insures that the heat provided thereby is directed against the bottom-most portion of the vessel and thereby supplements the main circuit in supplying the necessary heat for distilling the high boiling material remaining toward the end of the fractional distillation operation. At the same time, the auxiliary element through appropriate control means may be intermittently energized to maintain the temperature uniform while the main element, during the major portion of the distillation operation, is continuously energized.

Thus it is a primary object of this invention to provide an electrical heating device having dual heating elements so related as to be separately energizable for uniformly controlled temperature heating.

It is a further object of this invention to provide an electrical heating device incorporating defined area heating which is particularly desirable for fractional distillation to preclude undesirable superheating of the vapors within the vessel being heated.

It is an additional object of this invention to provide an electrical heating device adapted to heat glass and other fragile vessels incorporating a main heating element and an auxiliary heating element, with such auxiliary element so related to the heating device as to provide supplemental heating for the high boiling residues remaining toward the end of a distillation operation.

For a further and more detailed understanding of the present invention and the additional objects and advantages realized therefrom, reference is made to the following description and the accompanying drawings, wherein.

Figure 1:
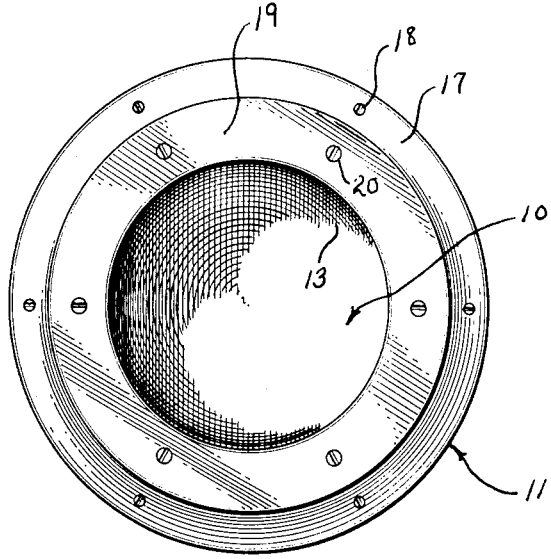
Figure 1 is a plan view of the electrical heating device of this invention.
Figure 2:
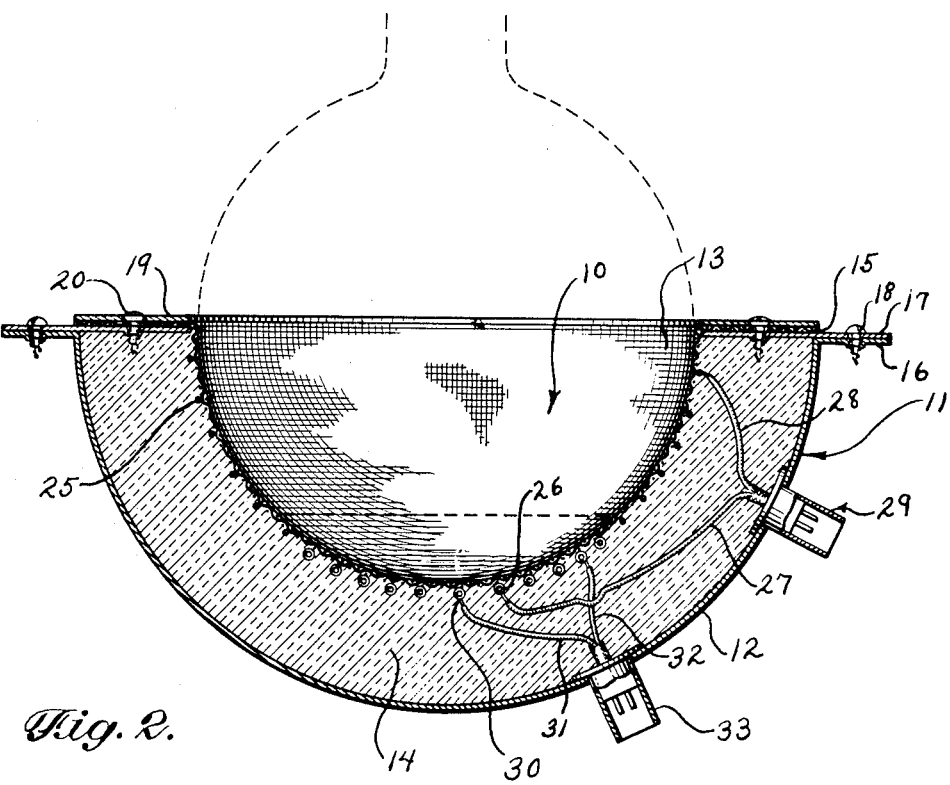
Figure 2 is a cross sectional view illustrating the heating elements incorporated into the heating device.

Referring more specifically to the drawings, Figure 1 shows in plan a pocket 10 formed within a casing 11 to receive and partially encase the lower portion of a flask or vessel, the contents of which are to be heated. In the illustrated embodiment, as clearly shown by the cross-sectional view of Figure 2, the pocket 10 is hemispherical in shape so as to substantially conform to the lower half of the spherical portion of a flask to be heated. It will be readily recognized that within the scope of this invention the pocket 10 need not necessarily be hemispherical but may be formed within the casing 11 of any desired shape so as to generally conform to the outer contour of a particular shape vessel to be heated.

The casing 11 is made up of an outer shell 12 and an inner member 13 of flexible fireproof fabric such as glass cloth. This inner member 13 is formed into the desired shape to constitute the surface of pocket 10. A suitable heat insulating material 14 is interposed between the outer shell 12 and the inner member 13 which forms the pocket 10. This insulating material may consist of glass wool, asbestos fibres, rock wool, or any other suitable material having the desired heat resisting qualities, and which desirably will permit the fabric 13 to assume as closely as possible the contour of the vessel to be heated.

The inner member 13 which forms the pocket 10 in the casing 11 has a flange 15 extending around the periphery of the upper edge of pocket 10. The outer shell 12 is likewise flanged as at 16, and an annular member 17 secured to the flange 16 by suitable fastening means 18 with the inner portion of such annular member covering the upper edge of the heat insulating material 14 and underlying the flange 15 of the inner member 13. To rigidly secure the flange 15 to the annular member 17, a ring 19 is positioned above the flange 15 so as to encase such flange between the inner portion of annular member 17 and ring 19. A series of suitable fasteners 20 are employed to connect the ring 19 and annular member 17 so as to sandwich the flange 15 therebetween.

The main heating element of the heating device consists of a resistance wire spirally wound around the surface of the pocket 10 and preferably secured to the surface of the inner member 13. The resistance wire which forms the main heating element embraces the upper peripheral portion of pocket 10 in the form of a single wire strand 25. This single strand of resistance wire wound around the pocket 10 continues downwardly from the upper edge of the pocket to a point adjacent the bottom of such pocket. At a point near the pocket bottom, the single resistance wire strand 25 is joined with a resistance wire coil 26, which coil formed into a spiral completes the coverage of the pocket 10 by the main heating element. Although in the illustrated embodiment the heating elements are spirally formed, it will be appreciated that the resistance wires may be distributed over the pocket surface in a manner other than in the spirally disposed formation.

The provision of the coil portion of the main heating element toward the bottom of the pocket 10 insures that in the main heating circuit a substantial portion of the heat generated in the resistance wire will be directed against the bottom of the vessel being heated. At the same time the single resistance wire strand 25 surrounding the sides of the vessel being heated will heat the vessel sides to assist the coil portion 26 in the heating operation by the main heating element.

The upper end of the single resistance wire strand 25 and the opposite end of the resistance wire coil 26 are connected by lead-in wires 27 and 28 to a suitable connector 29 mounted in the outer shell 12. The connector 29 may be of any suitable construction to enable the heating device to be plugged into a source of power, either directly or through a suitable power control device as may be desired. The control device may either be an adjustable rheostat to vary the power input or a temperature responsive control to intermittently energize the main heating element.

The auxiliary heating element consists of a resistance wire coil 30 spirally wound so that the convolutions of such spiral are interposed between the convolutions of the spiral formation of resistance coil 26 of the main heating element. Resistance coil 30 is spirally formed to cover the central bottom portion of the pocket 10 which will be below the central bottom portion of the vessel being heated.

The opposite ends of the auxiliary heating element are connected by suitable lead-in wires 31 and 32 to a suitable connector 33 secured to the outer shell 12. In the embodiment shown, the connector 33 is similar to the connector 29 for the main heating element. As in the case of connector 29, connector 33 may be of any desired suitable design which will enable the auxiliary heating element to be coupled to a suitable source of electrical power. In the case of the auxiliary heating element, the connection thereof to the power source is preferably made through a suitable control mechanism which will serve to intermittently energize the auxiliary heating element to maintain the desired temperature of the contents of the vessel being heated. On the other hand, the control mechanism may be a rheostat to vary the power input to the auxiliary heating element.

In normal use the main heating element will be continuously energized to supply the average heat required for the overall distillation operation. The energization of this main heating element will cause the single resistance wire strand 25 to heat the sides of the vessel adjacent the central bottom portion thereof and the resistance coil portion 26, in series with the single resistance wire strand 25, will produce a more concentrated heating effect on the vessel toward the bottom thereof.

Toward the end of the distillation process, the higher boiling material remains in the bottom of the vessel adjacent the heating coil 26 spirally wound around the bottom of the pocket 10. The heat necessary to vaporize these high boiling residues remaining in the bottom of the vessel is supplied by energizing the auxiliary heating element made up of the resistance wire coil 30 which is disposed intermediate the convolutions of the spirally wound coil 26. Thus coil 30 subjects the bottom central portion of the vessel to the high heat necessary for distillation of the high boiling material without unduly heating the vessel sides, which would cause superheating of the distilled vapors in the vessel.

In addition to the function of the auxiliary heating element in providing the extra heat for the high boiling residues, such auxiliary heating element serves as an ideal control element to maintain a substantially uniform temperature within the vessel during the entire distillation process. Thus whereas the main heating element, consisting of resistance wire strand 25 and coil 26, provides uniform average heat for the distillation, the resistance wire coil 30 of the auxiliary heating element may be automatically turned on and off to supply the supplemental heat which, in combination with the heat from the main heating element, will keep the vessel contents at the proper temperature. As pointed out hereinabove, the intermittent energization of the auxiliary heating element may be performed by any suitable control means which is responsive to the temperature of the vessel contents.

Merely as an example of the relationship between the area covered by the auxiliary heating element and the entire area encased by the pocket 10, it has been found to be preferable that the auxiliary heating element cover not over 25 percent of the entire area to be heated. This portion of the entire area embraced by the heater includes the essential region which should be supplied with a greater quantity of heat to produce the desired distillation of the higher boiling residues.

In the illustrated embodiment the auxiliary heating element is located adjacent the bottom central portion of the pocket 10 and is interrelated with the main heating element so as to cover an area which is also embraced by the main heating element. This interrelation of the resistance wire coils 26 and 30 causes the main heating element and auxiliary heating element to individually heat the same general area. However, it will be readily recognized that, within the scope of this invention, the auxiliary heating element alone may cover the central bottom area of the pocket 10 with the main heating element terminating at a point adjacent the edge of the auxiliary heating element to provide the desired heat for a portion of the sides of the vessel being heated.

Having thus described my invention, what I claim is:

1. A heating device adapted to support and heat a fragile vessel comprising, an inner member generally shaped to provide a pocket for partially encasing the bottom and lower side portions of the vessel to be heated, an outer member spaced from and connected to said inner member, heat insulating material between said inner and outer members, a main heating element affixed to said inner member and distributed over substantially the entire surface of said pocket to be effective in applying heat to the bottom and lower side portions of the vessel being heated, an auxiliary heating element affixed to said inner member and distributed over only the lower central portion of said pocket to be effective in applying heat to the bottom of the vessel being heated, said heating elements being separately energizable to effect controlled heating of the vessel supported on said device.

2. A heating device as recited in claim 1 wherein said main heating element has a first portion consisting of a resistance wire strand distributed over the sides of said pocket remote from the lower central portion thereof, and a second portion consisting of a coiled length of resistance wire distributed over the lower central portion of said pocket.

3. A heating device as recited in claim 1 wherein said inner member consists of a flexible fireproof fabric and said main heating element and said auxiliary heating element are interwoven into the fabric forming said inner member.

4. A heating device adapted to support and heat a fragile vessel comprising, an inner hemispherical member having a flange around the peripheral edge thereof, an outer member receiving said inner member therewithin and spaced therefrom, heat insulating material between said inner and outer members, said outer member having an edge flange lying in the general plane of the flange on said inner member, means interconnecting the flanges on said inner and outer members, a main heating element affixed to said inner member and distributed over substantially the entire hemispherical surface thereof, an auxiliary heating element affixed to said inner member and distributed over only the lower central surface portion thereof, and separate connectors mounted in said outer member to permit said heating elements to be individually connected to a source of power.

References Cited in the file of this patent

UNITED STATES PATENTS

| | | |
|---|---|---|
| 1,961,136 | Cretors | June 5, 1934 |
| 2,258,210 | Maxwell | Oct. 7, 1941 |
| 2,482,665 | Geyer | Sept. 20, 1949 |